US009651968B2

(12) United States Patent
Pujol et al.

(10) Patent No.: US 9,651,968 B2
(45) Date of Patent: May 16, 2017

(54) LINEAR POWER REGULATOR DEVICE WITH VARIABLE TRANSCONDUCTANCE DRIVER (75) Inventors: Alexandre Pujol, Ste Foy D'Aigrefeuille (FR); Philippe Givelin, Leguevin (FR); Mohammed Mansri, Toulouse (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/415,643

(22) PCT Filed: Jul. 19, 2012

(86) PCT No.: PCT/IB2012/001608
§ 371 (c)(1),
(2), (4) Date: Jan. 19, 2015

(87) PCT Pub. No.: WO2014/013288
PCT Pub. Date: Jan. 23, 2014

(65) Prior Publication Data
US 2015/0212531 A1    Jul. 30, 2015

(51) Int. Cl.
G05F 1/625    (2006.01)
G05F 1/59    (2006.01)
H02M 3/158    (2006.01)
G05F 1/565    (2006.01)
G05F 1/573    (2006.01)
G05F 1/575    (2006.01)

(52) U.S. Cl.
CPC .............. *G05F 1/625* (2013.01); *G05F 1/565* (2013.01); *G05F 1/573* (2013.01); *G05F 1/59* (2013.01); *H02M 3/158* (2013.01); *G05F 1/575* (2013.01)

(58) Field of Classification Search
CPC .................................. G05F 1/625; G05F 1/56
USPC ........................................ 323/273, 270, 271
See application file for complete search history.

(56) References Cited

U.S. PATENT DOCUMENTS

| 5,744,942 | A | 4/1998 | Armstrong, II et al. |
|---|---|---|---|
| 5,828,205 | A | 10/1998 | Byrne |
| 6,300,749 | B1 | 10/2001 | Castelli et al. |
| 6,522,111 | B2 | 2/2003 | Zadeh et al. |
| 2005/0189934 | A1 | 9/2005 | Poss |
| 2006/0226821 | A1* | 10/2006 | Whittaker ............... G05F 1/575 323/282 |
| 2008/0169795 | A1* | 7/2008 | Wang ...................... G05F 1/575 323/280 |
| 2010/0213917 | A1 | 8/2010 | Pulijala et al. |
| 2011/0095744 | A1 | 4/2011 | Unetich et al. |
| 2013/0162233 | A1* | 6/2013 | Marty ................... H02M 3/158 323/274 |

(Continued)

OTHER PUBLICATIONS

International Search Report and Written Opinion correlating to PCT/IB2012/001608 dated Mar. 29, 2013.

*Primary Examiner* — Jue Zhang
*Assistant Examiner* — Trinh Dang
(74) *Attorney, Agent, or Firm* — Charlene R. Jacobsen (57) ABSTRACT The present invention pertains to a linear power regulator device that includes an internal pass device, a driver device having a driver output arranged to drive the internal pass device via the driver output. The linear power regulator device also includes an external connection connectable or connected to an external pass device; and the driver device is arranged to drive the external pass device via the driver output and the external connection.

18 Claims, 2 Drawing Sheets

(56) References Cited

U.S. PATENT DOCUMENTS

2014/0084994 A1* 3/2014 Merkin ................... G05F 1/56
                                                             327/543

* cited by examiner

LINEAR POWER REGULATOR DEVICE WITH VARIABLE TRANSCONDUCTANCE DRIVER

FIELD OF THE INVENTION

This invention relates to a linear power regulator device and an electronic device comprising or being connected to a linear power regulator device.

BACKGROUND OF THE INVENTION

In many implementations, it is often advantageous to have a power regulator that can use either an external pass device or an internal pass device as part of the general regulator topology. The pass device is that device in a series (as distinct from shunt) regulator that passes current from the power source to the load. Use of an external pass device is generally done to place most of the power dissipation on the external pass device, rather than entirely with the remainder of the regulator, which may be on an integrated circuit (IC). The integrated circuit may or may not have other significant power dissipation sources, so thermal management may be a system concern. An internal pass device is usually selected when power dissipation is not a concern, and the area and cost of the external pass device may be avoided. The topology of a series regulator using a series pass transistor for a pass device whose low impedance terminals couple a source of power to a load and whose high impedance terminal couples to an error amplifier that increases difference between an output, which may or may not be scaled, and a reference signal is known.

However, the known power regulator devices suffer from a lack of stability under differing conditions. Although stability can be easily achieved for an external pass device over the full range of output current using external compensation circuitry, the same compensation network cannot guarantee the stability while using an internal pass device.

SUMMARY OF THE INVENTION

The present invention provides a linear power regulator device and an electronic device comprising or being connected to a linear power regulator device.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawing. In the drawing, like reference numbers are used to identify like or functionally similar elements. Elements in the FIG. are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Figure 1:
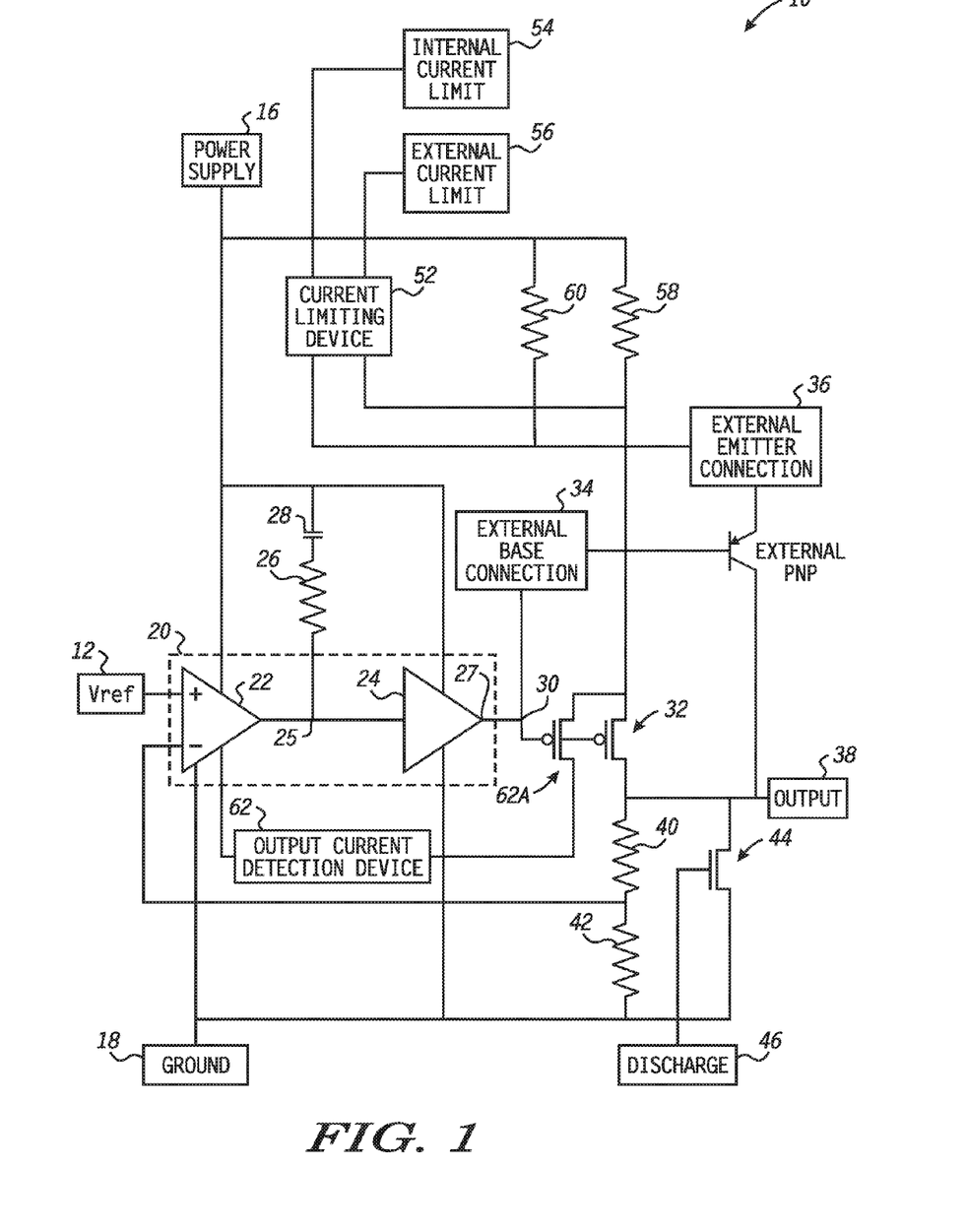
FIG. 1 schematically shows a circuit diagram example of an embodiment of a linear power regulator device.

Referring to FIG. 1, this schematically shows an example of a linear regulator device 10. The linear power regulator device may be arranged to provide an output voltage and/or output current based on a reference voltage and a supply voltage. The linear power regulator device may be a linear voltage regulator device with a low dropout voltage, which may be called a LDO device. As shown in the example of FIG. 1, the linear power regulator device 10 may comprise a power supply connector 16 connected, or connectable, to a power supply, such as a voltage or current supply, e.g. a battery and/or a power outlet and/or a power generator.

The device 10 may further comprise an output connector 38. The connector 38 is connected, or connectable to an external load (not shown), at which an output voltage may be supplied. In particular, the output voltage and/or output current may be provided to an electronic device, or other load, to supply it with electrical energy via the output connector 38. The external load can e.g. be connected between the regulator output connector 38 and ground 18. In the shown example, the device 10 is implemented an integrated circuit (IC) with one or more dies in a single package, and the connector can e.g. be an output pin which connects a pad on a die in the package to the outside of the package. However another suitable connector may be used.

The device 10 comprises an internal pass device 32 and is connectable with an external connector, e.g. a pin, 34 to an external pass device 50. When in operation, the pass device 32,50 provides a connection to the power source to the external load, and regulates the power, e.g. the current and/or the voltage, provided to the load from the power source. In this example, when connected, the load is connected in series with the pass devices 32,50, which in turn are connected in parallel to each other. In this example, the external load can e.g. be connected between the regulator output connector 38 and ground 18.

The linear regulator device 10 further comprises a driver 20 having a driver output 27 at which a drive signal is outputted in operation. The driver 20 arranged to drive (e.g. to provide a control input of the pass device with a signal to control the current flowing through the pass device between the current terminals thereof) the internal pass device 32 via the driver output 27, which in this example is connected to a control terminal of the internal pass device 32. The linear power regulator device 10 further comprises a pin, or other type of connector 34, connectable to a control terminal of the external pass device 50. The driver output 27 is also connected to the pin 34, and the driver device 20 is thus arranged to drive or control both the internal pass device 32 and the external pass device 50 via the driver output 27. Since the internal pass device will behave differently when the external pass device 50 is present or absent, the presence of an external pass device 50 can be detected from differences in the power passing through the internal pass device when the external pass device 50 is present or absent, while the need for additional detection time and/or extensive dedicated circuitry may be obviated. Alternatively, the linear voltage regulator device may be arranged to drive the external pass device and the internal pass device via different driver outputs or paths The driver device 20 may be implemented in any manner suitable for the specific implementation. The driver device may, for example as shown comprise two driver inputs, e.g. connected as a differential input, as indicated with + and − in FIG. 1, and a single driver output 27. The driver may comprise one or multiple stages. In the example, the driver device comprises an input stage 22 and an output stage 24. The driver device 20 may comprise an input stage in the form of an input amplifier 22, which may be a differential amplifier or an error amplifier. A differential amplifier and/or an error amplifier may comprise a non-inverting input and an inverting input. The inputs of the differential amplifier or error amplifier may be considered to be the driver inputs of the driver device and/or the inputs of the input stage of the driver device. An output of input amplifier 22 may be connected to an input of an output stage in the form of a buffer stage 24 and the output of the buffer stage may form the output 27 of the driver device 20. As shown, the stages, i.e. in this example the input amplifier 22 and/or the buffer 24, may be connected to the power supply connector 16 and the ground connection 18 to be provided with power.

The driver device 20 may further comprise a compensation resistor 26 and a compensation capacitor 28 arranged in series and connecting a connection node 25 (between the output of input amplifier 22 and the input of buffer 24) to the power supply connector 16.

The linear power regulator device 10 may comprise an output capacitor (not shown) connected to the output connector 38 and ground 18 or an external capacitor may be connected to the output connector 38 and ground 18 to operate as output capacitor. In the shown example, the linear power regulator device comprises a voltage divider, formed by resistors 40,42, which are connected between a power terminal of the internal pass device 32 and ground, and are thus connected in parallel to an external output capacitor when present. The output capacitor may be present in order to provide an output pole of the linear power regulator device 10, e.g. a fixed frequency pole. The linear power regulator device 10 is arranged to load the output capacitor during a start-up phase, i.e. during the phase in which the output capacitor is being loaded after a corresponding enable function has been activated. There may be provided suitable resistors to accompany the capacitors.

As shown, the device 10 may further comprise a discharge device 44, in this example may a transistor, e.g. NMOS transistor. The discharge device 44 may be connected to a discharge connection 46. Via discharge device 44 and discharge connection 46 the output capacitor may be discharged.

The driver device 20, or at least one stage such as the input stage 22 of the driver device, may have a variable, and optionally controllable, transconductance. The linear voltage regulator may comprise transconductance control circuitry be arranged to control the transconductance of the driver device and/or the input stage based on a current flowing through the internal pass device (32) and/or the external pass device (50), e.g., based on a comparison of the output current with a (range of) predetermined current values. Thereby, the linear voltage regulator may operate in a stable manner while the need for e.g. changes in the network compensation or current biasing can be obviated.

For example, the linear voltage regulator may operate stably at a first transconductance if an external pass device is present and/or at a high output current (even if no external pass device is present) while the linear voltage regulator operates stably at a second transconductance if no external pass device is present and/or the output current is low. Accordingly, the transconductance control circuitry may be arranged to control the driver device to have the second transconductance if no external pass device is present and the current flowing through the internal pass device is low and to operate at the first conductance if an external pass device is present or the current flowing through the internal pass device is high. Alternatively or additionally, if an external pass device is present, the driver device may be switched between the second transconductance and the first transconductance depending on the output current, e.g. high or low, provided by the external pass device. The current may be considered to be low if it is lower than a predetermined switching current value. The predetermined switching current values for an external pass device may be different from those for an internal pass device.

As explained below, the current passing through the internal pass device can be used to detect the presence or absence of an external pass device, and accordingly the transconductance control circuitry may be arranged to switch the driver device between the first transconductance and the second transconductance depending on the output current provided by the internal pass device.

The transconductance control circuitry may be arranged to change the transconductance depending on, i.e. as a function of, an output current if no external pass device is connected to the linear voltage regulator device 10, for example to operate the driver at the first transconductance if an external pass device is connected and/or if a high current flows through the internal pass device. The linear voltage regulator device may be arranged to operate at the second transconductance if a low current flows through the internal pass device. The current may be considered to be high if it is higher than a predetermined switching current value.

The transconductance may be controlled in any suitable manner. For example, the driver device 20 may have a first mode with a first transconductance and a second mode with a second transconductance. The first transconductance may e.g. be lower than the second transconductance. The transconductance control circuitry may for example dynamically switch between the first transconductance and the second transconductance if the output current changes. In the shown example, the driver device comprises an input stage 22 having a variable transconductance. In particular, the input stage 22 may be switchable between a mode with the first transconductance and a mode with a second transconductance, allowing to switch the driver device 20 between discrete transconductance values. However, the driver device 20 may be implemented to have a variable transconductance that can be varied over a range of transconductances in a continuous manner, e.g. the transconductance can be set to any value in the continuous range. It should be noted that additionally, or alternatively, to the input stage 22 any other suitable stage of the driver device with a variable transconductance, e.g., a buffer or an interstage amplifier may be used to modify the transconductance of the driver device 20.

The transconductance of the driver device 20 may be switchable in any suitable manner. For instance, the stage(s) with the variable transconductance, such as in the example of FIG. 1 the input stage 22, may comprise one or more switchable transistors. The switchable transistors may be switchable by the transconductance control circuitry to change the transconductance of the driver device 20. Suitable on/off switches or latches arranged to switch on or off the switchable transistors. In the example of FIG. 1 for instance, the output current detection device 62 may be arranged to switch on and/or off one or more transistors of the input stage 22 to change the transconductance.

The transconductance control circuitry may comprise or be connected to an external pass device detection device, arranged to detect whether an external pass device is connected or not. For example, the transconductance control circuitry may be connected to the current limiting device 52 (or the flag connection 54,56), which provides a signal during start-up indicating the presence or absence of an external pass device. Additionally or alternatively, as shown in FIG. 1 the transconductance control circuitry may be provided with a dedicated auto-detection capability as described herein below. The transconductance control circuitry may for example comprise a dedicated output current detection device 62, which may be arranged to determine the amount of output current flowing through the internal pass device and/or the external pass device.

The output current detection device 62 may be arranged to control the transconductance of the driver device 20 based on the amount of output current flowing through one of the pass devices 32,50, e.g. the internal pass device 32, if the other pass device, e.g. the external pass device 50, is not operable or not operably connected. In particular, the output current detection device may be arranged to determine an output current flowing through the internal pass device if no external pass device is present and to control the transconductance based on the determined output current. The output current detection device 62 may be arranged to receive a signal indicative of whether an external pass device is present or absent, which may be provided, for example, by an external pass device detection device, e.g. connected to flag connections 54,56. Accordingly, the output current detection device 62 may control the transconductance depending on whether an external pass device is determined to be present or not, even if the output current detection device 62 is driven independently of the internal pass device 32 and/or the external pass device 50 and/or the pass drives have to be explicitly controlled to be switched on or off.

The output current detection device 62 may be implemented in any manner suitable for the specific implementation. The output current detection device 62 may for example comprise a transistor 62A, e.g. a PMOS transistor, arranged in a manner suitable to provide a current indicative of an output current flowing through the internal pass device 32. The control input, e.g. the gate, of this transistor can e.g. be connected to the output 27 of driver device 20, e.g., via node 30, thus receiving a signal that control the current through the pass device and hence arranged to provide a current indicative of the current through the pass device. Additionally or alternatively, the output current detection device 62 may be arranged to determine an output current flowing through external pass device 50 and comprise a corresponding branch of circuitry (not shown).

The threshold voltage of the transistor of the current detection device 62, i.e. the voltage at the control input at which the device opens and passes current. may be larger than the voltage of a control input of an external pass device if such is present. In particular, the threshold voltage may be essentially the same as the threshold voltage Vth of the control input of internal pass device 32.

The output current detection device 62 may be connected to one or more transconductance control devices of the driver device 20, such as for instance one or more switches of the input amplifier 22. The switches may be arranged to switch on or off one or more transistors to change the transconductance of the input stage 22.

Figure 2:
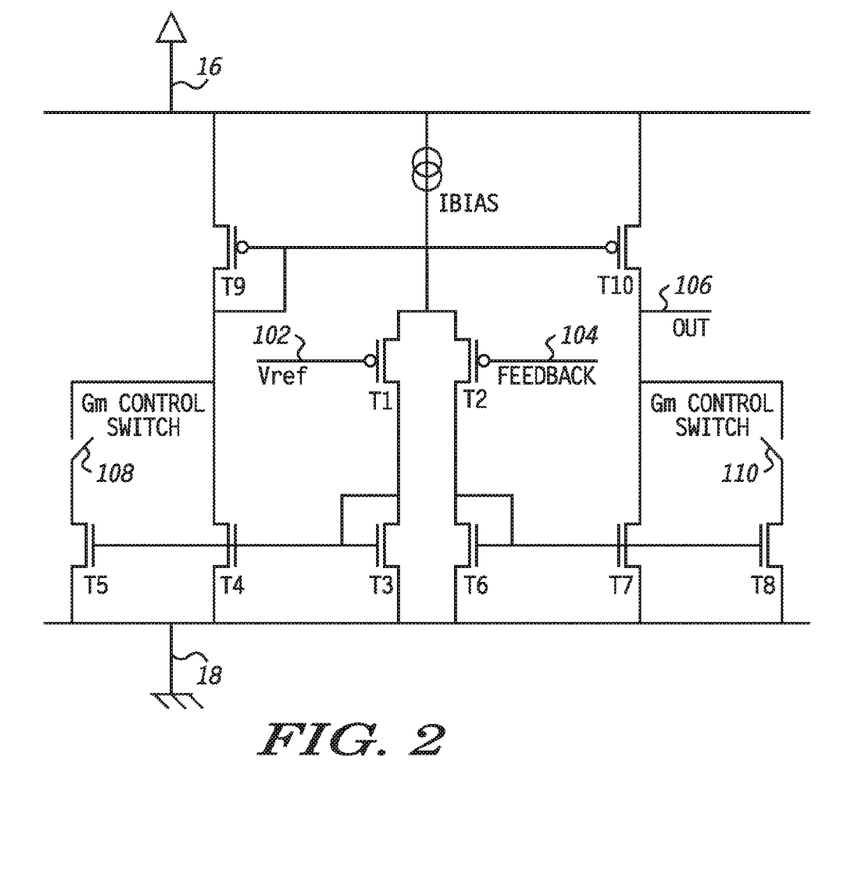
FIG. 2 schematically shows an example of an input stage of a driver device of a linear voltage regulator device.

FIG. 2 schematically shows an example of an input stage, which is an input amplifier 22 as shown in FIG. 1. The input stage comprises a differential pair of PMOS transistors T1 and T2. Transistor T1 has a control input or gate electrode connected to a reference voltage via a connection 102. A control input or gate electrode of transistor T2 is connected to an output voltage feedback connection 104. The source and drain electrodes of transistors T1 and T2 is connected to a supply voltage connection 16 and a ground connection 18 to provide a current BIAS.

The input stage may comprise pairs of mirror transistors T9, T10 and/or T3, T6 and/or T4, T7 to provide a mirror current. Via a connection 106 arranged between transistors T10 and T7 an input of an interstage amplifier or buffer 24 is connected. Via this connection 106, a signal is outputted by the input amplifier 22, which in the example is an error amplifier.

The input stage 22 may comprise a pair of additional transistors T5 and T8. A first switch 108 is provided which is associated to transistor T5. A second switch 110 is provided which is associated to transistor T8. The switches 108 and 110 are controlled by an output current detection device, which is a device 62 as described above. Via switch 108, transistor T5 is switched in and out of the mirror arrangement. Via switch 110, transistor T8 is switched in and out of the mirror arrangement. If the switches 108, 110 are closed, the transistors T5 and T8 may contribute to the mirror current of the input stage and thus may increase the transconductance from a first transconductance to a second transconductance. The bias current BIAS is not changed by switching on the transistors T5 and T8.

The input stage 22 is switched to the second transconductance if no external pass device is present and the current flowing through the internal pass device 32 is lower than a predetermined switching value. If the current flowing through the internal pass device 32 is higher than the predetermined switching value, the input stage is controlled to operate at the first transconductance. In the example shown in FIG. 2, the transistors T1 and T2 are implemented as PMOS transistors. The mirror transistors T3, T4, T5, T6, T7, T8, T9 and T10 are implemented as NMOS transistors. However, the transistors T1 and T2 may alternatively be NMOS transistors, and the other transistors PMOS transistors.

In the example of FIG. 1, one driver input, in particular a non-inverted input +, is connectable, and shown in a connected state, to a reference voltage source 12, e.g., via a reference voltage node. A second driver input, in particular an inverted input (indicated with the minus sign in FIG. 1), is connectable, and shown in a connected state to receive a feedback voltage from the driver output 27, e.g., be provided by a node of the output voltage divider 40,42.

The pass devices 32, 50 may be connected in any suitable manner and be any suitable type of pass device. The pass device may be arranged to provide an output voltage and/or output current controlled by the driver device, and for example be connected with a first current terminal to the supply 16 and with a second current terminal to the load, while a control terminal is connected to the driver device 20. The power passing through the pass device from the first current terminal to the second current terminal, e.g. the current flowing, may be controlled by a signal, e.g the voltage, provided at the control input. The driver output 27 of the driver device 20 may be connected or connectable to a control input of the respective pass device, which in particular may be a base electrode or gate electrode of a transistor of a pass device.

The pass devices may be arranged to provide an output voltage and/or output current according to a signal provided by a driver device to the control input, e.g., a base electrode or a gate electrode, of the respective pass device. The signal may be provided via the driver output without a further active component being arranged between the driver output and the control input of the respective pass device.

The linear power regulator device 10 may be arranged such that the control inputs of the external pass device 50 and the internal pass device 32 receive a voltage or signal which from a practical standpoint is the same, although for the respective application immaterial differences may be present. For example, (when an external pass device is connected and/or operating) the voltage applied at the control input of the internal pass device may be lower than the threshold voltage of the internal pass device. The internal pass device may be arranged such that its threshold voltage Vth, i.e. the voltage at the control input at which the device opens and passes current, is lower than a voltage at the external connector 38, for example larger than a base-emitter voltage of a transistor of an external pass device. In such case, suitable components, in particular passive components like one or more resistors, may be provided to ensure that the threshold voltage of the control input of the internal pass device is larger than the voltage applying at its control input if an external pass device is connected and/or operating and/or than the voltage at a control input of an external pass device the control input of the external pass device is connected to and/or at the external connector.

The internal and/or external pass device may for example comprise one or more transistors. For example, the internal pass device may be implemented on the same integrated circuit and/or die as the linear power regulator device, in particular on the same integrated circuit as the driver device. An internal pass device may e.g. comprise one or more transistors, in particular one or more MOS transistors, e.g. one or more PMOS transistors. As shown, the external pass device may be implemented separately of the driver device in any suitable manner, e.g., on a separate integrated circuit and/or die and/or as a discrete component, for example as a transistor, such as a bipolar transistor, for example a PNP or NPN bipolar junction transistor. The external pass device may e.g. serve to avoid heat dissipation in the linear power regulator device and/or to provide a larger output current to the load. Also, an external pass device which can switch faster than the internal pass device may be used, for example an external bipolar device (generally faster to switch than a field effect transistor) may be used when a field-effect transistor is present as internal pass device The external pass device may be connected in any suitable manner to the regulator device 10. As shown, the linear power regulator device may comprise external connectors 34,36,38 arranged to be connected, or connectable, to the external pass device. For example, a first external connector 34 may be connected or connectable to a control electrode of the external pass device 50, such as to a base electrode. The linear power regulator device 10 may comprise a second external connection 36. A first current electrode, in particular an emitter electrode, of the external pass device 50 may be connected to the second external connection 36. There may be provided a third external connector 38 arranged to connect to another current electrode of the external pass device, e.g., a collector electrode, and to a load.

As stated above, in the shown example the presence of an external pass device 50 can be detected from differences in the power passing through the internal pass device when the external pass device 50 is present or absent, while the need for additional detection time and/or extensive dedicated circuitry may be obviated. The presence may be detected in any manner suitable for the specific implementation.

For example, as shown in FIG. 1, the linear power regulator device 10 may comprise a current limiting device 52 arranged to limit the power passed through, e.g. as current flowing through, the internal pass device and/or the external pass device to remain below a respective predetermined threshold value. The threshold value for the current limit for the external pass device may be different from the value for the internal pass device. The threshold values may be defined such that they are reached during start-up, when the output capacitor is loaded. The threshold value for the internal pass device may be predetermined such that the current flowing through an internal pass device is limited during start-up if no external pass device is present. An external current limit for an external pass device may be predetermined such that the current going through an external pass device is limited during start-up if an external pass device is present.

The linear power regulator device 10 and/or the current limiting device 52 may be arranged to provide a signal or flag indicating when an output current is limited. In particular, the current limiting device 52 may be arranged to set an internal limit flag indicating that the current flowing through the internal pass device being limited and/or to set an external limit flag indicating that a current flowing through an external pass device being limited. The current limiting device and/or the linear power regulator device may comprise an internal limit flag connection 56 and/or an external limit flag connection 54 via which the corresponding signals or flags may be provided. An electronic device may be arranged to be connected to the internal current limit connection 56 and/or the external current limit connection 58 to receive corresponding signals.

The current limiting device may be implemented in any manner suitable for the specific implementation. The current limiter may for example comprise a transistor of which the control input, e.g. gate or base, is connected to a suitable passive sense circuit that senses the current drawn through the transistor and controls the transistor as a function of the drawn current to ensure that the current remains below a current threshold. In the shown example, for instance, the current limiting device 52 is connected to the second external connection 36 via a connection. A second connection, parallel to this connection line, connects the second external connection 36 via a resistor 60 to power supply connector 16. The first current terminal of the internal pass device 32 is connected to the current limiting device 52 via a connection. As shown, a second connection, in parallel to that connection, connects the first current terminal of the internal pass device 32 to the power supply connector 16 via a resistor 58. Thus if a current flows to the output connection 38 (i.e. the output capacitor), a corresponding current flows via the resistor 60 or the resistor 58, depending on whether the output current flows via the internal pass device 32 or the external pass device 50. Accordingly, the current may be detected and/or limited by the current limiting device 52.

The linear power regulator device 10 may comprise or be connected to a reference voltage source providing a reference voltage via a reference voltage connection 12. The reference voltage source may, for example, be a band-gap reference. The reference voltage source may be part of the linear power regulator device, or it may be implemented separately.

Herein after, a method of regulating power provided linearly, as may be performed by the example of FIG. 1 is described. Initially, the linear power regulator device, may be operating as it may be turned on so that an output capacitor (not shown) may be loaded, for example by an enable device via which the regulator device 10 is switched on, such as by closing a switch between the power supply and power supply connector 16.

If no external pass device 50 is present, there may be a strong differential voltage applying to the driver device 20, in particular the input amplifier 22. The internal pass device 32 may be driven by the driver output 27 to load the output capacitor with a large current. This current may be limited by the current limiting device 52, which may be arranged to provide a corresponding signal via the internal current limit connection 56. That the internal pass device 32 is used during start-up may be determined based on the presence of a corresponding internal current limit signal. In this case, it may be assumed that no external pass device 50 is present or operably connected to the linear power regulator device 10. On the other hand, when an external pass device 50 is present, the output capacitor may be loaded via the external pass device 50. This can be due to the external pass device 50 switching faster than the internal pass device 32, in particular if the external pass device 50 comprises a bipolar transistor. Alternatively or additionally, this can be due to the minimum voltage required at the control input of the external device 50 to enable power passing through the external pass device being lower than the threshold voltage Vth at which the internal pass device 32 starts passing power.

When the external pass device 50 passes power and the internal pass device 32 does not, the current flowing through the external pass device 50 could be limited and the current through the internal pass device 32 would not. Thus, the current limiting device 52 provides a corresponding external current limit flag via external current limit connection 54 and does not provide an internal current limit flag via internal current limit connection 56.

Since, if the threshold voltage of the internal pass device 32 is larger than the voltage applying at the control input of the external pass device 50, the internal pass device is turned off the need for a switch or a dedicated detection device detecting whether an external pass device is present or not to switch off the internal pass device 32 is obviated.

Furthermore, the already present current limiting device 52 may be arranged to indicate via corresponding current limit flags or signals whether an external pass device 50 is present or not. The linear power regulator device allows automatic detection whether an external pass device is present or not, provides a corresponding signal and automatically ensures that an internal pass device is not used when an external pass device is present without additional circuitry to detect and/or switch pass devices or providing signals being necessary. Accordingly, the linear power regulator device is compact and does not require additional power.

An electronic device may comprise or be connected to a linear power regulator device, which may be a device as described herein above. The electronic device comprises an external pass device, which may be connected or connectable to the linear power regulator device. The electronic device may comprise a controller, which may be connected or connectable to the internal current limit connection 56 and/or the external current limit connection 54. The controller is arranged to determine whether an external pass device 50 is connected to the linear voltage regulator 10 based on signals received via the connections 54, 56, in particular during a start-up of the linear power regulator device 10. In particular, the controller may be arranged to determine that an external pass device 50 is present, if during start-up an external current limit flag is provided and/or no internal current limit flag is provided. The controller may be arranged to determine than no external pass device 50 is present, if during start-up an internal current limit flag is provided and/or no external current limit flag is provided. The controller may be arranged to determine during a pre-determined period of time around and/or after commencement of the start-up which current limit flag is provided. In the example, the controller determines a fault if during start-up the external current limit flag and the internal current limit flag are provided or if neither of these flags is provided.

In the foregoing specification, the invention has been described with reference to specific examples of embodiments of the invention. It will, however, be evident that various modifications and changes may be made therein without departing from the scope of the invention as set forth in the appended claims, and that the claims are not limited to the specific examples shown or described.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals. A connection may refer to a pin or port or pad arranged to be connected to a complementary connection to transfer electrical signals and/or to provide a voltage and/or current.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the driver device may comprise only an input stage or comprise additional component device arranged between the driver inputs and the driver output.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated examples may be implemented as circuitry located on a single integrated circuit or within a same device. For example, the linear power regulator device and an external pass device may be implemented in one electronic device. Alternatively, the examples may be implemented as any number of separate integrated circuits or separate devices interconnected with each other in a suitable manner. For example, an external pass device may be arranged in a device separate from the linear power regulator device.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A linear voltage regulator device, comprising:
an external connection connectable, or connected, to an external pass device connected between a power source and an external load, and arranged to regulate a power provided by said power source to said external load if said external connection is connected to the external pass device;
an internal pass device connectable between the power source and the external load, and arranged to regulate said power when said external connection is not connected to the external pass device;
a driver device having a variable transconductance and arranged to drive the internal pass device and arranged to drive the external pass device via the external connection; and
a transconductance control circuitry arranged to control the variable transconductance to change depending on an output current flowing through the internal pass device and/or the external pass device, wherein
the driver device has a first mode with a first transconductance and a second mode with a second transconductance and
the transconductance control circuitry is configured to control the driver device to be in the first mode or the second mode depending on the output current flowing through one or more of the internal pass device and the external pass device transconductance.

2. The linear voltage regulator device according to claim 1, wherein the transconductance control circuitry comprises an output current detection device arranged to determine an output current flowing through the internal pass device and/or the external pass device.

3. The linear voltage regulator device according to claim 1 wherein the driver device comprises an input stage having the variable transconductance.

4. The linear voltage regulator device according to claim 1, the transconductance control circuitry being arranged to change the variable transconductance depending on an output current if no external pass device is connected to the linear voltage regulator device.

5. The linear voltage regulator device according to claim 1, wherein
the first transconductance is smaller than the second transconductance, and
the transconductance control circuitry is configured to control the driver device to be in the first mode if one or more of the external pass device is connected and if a high current exceeding a predetermined threshold value flows through the internal pass device.

6. An electronic device comprising or being connected to a linear voltage regulator device according to claim 1.

7. The linear voltage regulator device according to claim 2, wherein the output current detection device being arranged to switch on and off one or more transistors of the driver device to change the variable transconductance of the driver device.

8. The linear voltage regulator device according to claim 3, wherein
one or more of the driver device and the input stage comprises one or more switchable transistors, and
the switchable transistors are configured to be switched by the transconductance control circuitry to change the variable transconductance of the one or more of the driver device and the input stage.

9. The linear voltage regulator device according to claim 5, the transconductance control circuitry being arranged to control the driver device to be in the second mode if a low current not exceeding the predetermine threshold value flows through the internal pass device.

10. The electronic device according to claim 6, further comprising an external pass device connected to the linear voltage regulator device.

11. A method comprising:
providing an external connection at a linear voltage regulator device, the external connection connectable, or connected, to an external pass device connected between a power source and an external load;
regulating a power provided by said power source to said external load if said external connection is connected to said external pass device;
regulating said power to said external connection using an internal pass device connectable between said power source and said external load when said external connection is not connected to said external pass device;
driving, by a driver device having a variable transconductance, said internal pass device, and said external pass device via the external connection; and
controlling, using transconductance control circuitry, said variable transconductance depending on an output current flowing through said internal pass device and said external pass device, wherein
said driver device has a first mode with a first transconductance and a second mode with a second transconductance; and
said transconductance control circuitry is configured to control said driver device to be in said first mode or said second mode depending on said output current flowing through one or more of said internal pass device and said external pass device transconductance.

12. The method of claim 11, wherein:
said first transconductance is smaller than said second transconductance; and
said transconductance control circuitry is configured to control said driver device to be in said first mode if one or more of said external pass device is connected and if a high current exceeding a predetermined threshold value flows through said internal pass device.

13. The method claim 11, wherein said transconductance control circuitry comprises an output current detection device arranged to determine an output current flowing through said internal pass device and said external pass device.

14. The method claim 11 wherein said driver device comprises an input stage having said variable transconductance.

15. The method of claim 11, wherein said transconductance control circuitry is arranged to change said variable transconductance depending on an output current if no external pass device is connected to said linear voltage regulator device.

16. The method claim 12, wherein said transconductance control circuitry is arranged to control said driver device to be in said second mode if a low current not exceeding the predetermine threshold value flows through said internal pass device.

17. The method of claim 14, wherein:
one or more of said driver device and said input stage comprises one or more switchable transistors; and
said switchable transistors are configured to be switched by said transconductance control circuitry to change said variable transconductance of the one or more of said driver device and said input stage.

18. A linear voltage regulator device, comprising:
an external connection connectable, or connected, to an external pass device connected between a power source and an external load, and arranged to regulate a power provided by said power source to said external load if said external connection is connected to the external pass device;
an internal pass device connectable between the power source and the external load, and arranged to regulate said power when said external connection is not connected to the external pass device;
a driver device having a variable transconductance and arranged to drive the internal pass device and arranged to drive the external pass device via the external connection; and
a transconductance control circuitry arranged to control the variable transconductance to change depending on an output current flowing through the internal pass device and/or the external pass device,
wherein said transconductance control circuitry comprises an output current detection device arranged to determine an output current flowing through said internal pass device and said external pass device.

* * * * *